(12) United States Patent
Milliman et al.

(10) Patent No.: US 11,701,863 B2
(45) Date of Patent: Jul. 18, 2023

(54) PARTIAL COVERAGE MULTILAYER DAMPING LAMINATE

(71) Applicant: Avery Dennison Corporation, Glendale, CA (US)

(72) Inventors: Henry W. Milliman, Painesville, OH (US); Mahesh Ganesan, Beachwood, OH (US)

(73) Assignee: Avery Dennison Corporation, Mentor, OH (US)

( * ) Notice: Subject to any disclaimer, the term of this patent is extended or adjusted under 35 U.S.C. 154(b) by 89 days.

(21) Appl. No.: 17/055,773

(22) PCT Filed: May 15, 2019

(86) PCT No.: PCT/US2019/032421
§ 371 (c)(1),
(2) Date: Nov. 16, 2020

(87) PCT Pub. No.: WO2019/222352
PCT Pub. Date: Nov. 21, 2019

(65) Prior Publication Data
US 2021/0229400 A1      Jul. 29, 2021

Related U.S. Application Data

(60) Provisional application No. 62/672,855, filed on May 17, 2018.

(51) Int. Cl.
*B32B 3/18*       (2006.01)
*B32B 7/14*       (2006.01)
(Continued)

(52) U.S. Cl.
CPC ............... *B32B 7/14* (2013.01); *B32B 3/18* (2013.01); *B32B 15/043* (2013.01); *B32B 15/20* (2013.01);
(Continued)

(58) Field of Classification Search
CPC ........ B32B 3/18; B32B 15/20; B32B 2307/56
See application file for complete search history.

(56) References Cited

U.S. PATENT DOCUMENTS 2,819,032 A   1/1958   Detrie et al.
3,087,571 A   4/1963   Kerwin, Jr.
(Continued)

FOREIGN PATENT DOCUMENTS

CN   1693350    11/2005
CN   101125904   2/2008
(Continued)

OTHER PUBLICATIONS

International Search Report and Written Opinion dated May 20, 2019 issued in corresponding IA No. PCT/US2019/024596 filed Mar. 28, 2019.
(Continued)

*Primary Examiner* — Elizabeth E Mulvaney (57) ABSTRACT

Provided herein are multilayer damping laminates comprising at least one constraining layer and at least one discontinuous damping layer. At least one discontinuous damping layer comprises one or more damping material regions and one or more gap regions, wherein the percent coverage of at least one discontinuous damping layer by one or more damping material regions is less than 99%. Also provided are systems and methods using the multilayer damping laminates.

29 Claims, 5 Drawing Sheets

(51) Int. Cl.
    *B32B 15/04*    (2006.01)
    *B32B 15/20*    (2006.01)
(52) U.S. Cl.
    CPC ....... *B32B 2307/56* (2013.01); *B32B 2605/08* (2013.01)

(56) References Cited

U.S. PATENT DOCUMENTS

| | | | |
|---|---|---|---|
| 3,160,549 | A | 12/1964 | Caldwell et al. |
| 3,476,209 | A | 11/1969 | Cohen |
| 4,340,437 | A | 7/1982 | Rogers |
| 4,447,493 | A | 5/1984 | Driscoll et al. |
| 4,576,850 | A | 3/1986 | Martens |
| 4,742,107 | A | 5/1988 | Statz |
| 4,859,523 | A | 8/1989 | Endoh et al. |
| 5,063,098 | A | 11/1991 | Niwa et al. |
| 5,262,232 | A | 11/1993 | Wilfong et al. |
| 5,356,715 | A | 10/1994 | Levine |
| 5,474,840 | A | 12/1995 | Landin |
| 5,593,759 | A | 1/1997 | Vargas et al. |
| 5,618,859 | A | 4/1997 | Maeyama et al. |
| 5,670,006 | A | 9/1997 | Wilfong et al. |
| 5,712,038 | A | 1/1998 | Yamazaki et al. |
| 5,851,327 | A | 12/1998 | Landin |
| 5,858,521 | A | 1/1999 | Okuda et al. |
| 5,922,473 | A | 7/1999 | Muthiah et al. |
| 6,054,007 | A | 4/2000 | Boyd et al. |
| 6,147,150 | A | 11/2000 | Ohira et al. |
| 6,207,272 | B1 | 5/2001 | Takahira et al. |
| 6,245,419 | B1 | 6/2001 | Hakotani et al. |
| 6,296,979 | B1 | 10/2001 | Morita et al. |
| 6,315,851 | B1 | 11/2001 | Mazurek et al. |
| 6,420,447 | B1 | 7/2002 | Kittel et al. |
| 6,576,316 | B2 | 6/2003 | Simons et al. |
| 6,747,088 | B1 | 6/2004 | Schwalm et al. |
| 6,777,090 | B2 | 8/2004 | Baumgart et al. |
| 6,790,520 | B1 | 9/2004 | Todd et al. |
| 6,815,501 | B2 | 11/2004 | Flosbach et al. |
| 6,835,759 | B2 | 12/2004 | Bradford et al. |
| 6,863,629 | B2 | 3/2005 | Falone et al. |
| 6,949,591 | B1 | 9/2005 | Allard et al. |
| 6,953,105 | B2 | 10/2005 | Rust et al. |
| 7,144,955 | B2 | 12/2006 | Grace et al. |
| 7,176,258 | B2 | 2/2007 | Morihiro et al. |
| 7,241,837 | B2 | 7/2007 | Yaguchi et al. |
| 7,253,218 | B2 | 8/2007 | Hussaini et al. |
| 7,368,494 | B2 | 5/2008 | Morihiro et al. |
| 7,479,308 | B2 | 1/2009 | Baumgart et al. |
| 7,624,762 | B2 | 12/2009 | Cohen et al. |
| 7,713,604 | B2 | 5/2010 | Yang et al. |
| 7,812,107 | B2 | 10/2010 | Numazawa et al. |
| 7,915,321 | B2 | 3/2011 | Baumgart et al. |
| 7,973,106 | B2 | 7/2011 | Fisk et al. |
| 8,028,800 | B2 | 10/2011 | Ravnaas |
| 8,268,440 | B2 | 9/2012 | Takata et al. |
| 8,562,850 | B2 | 10/2013 | Miyawaki |
| 8,609,763 | B2 | 12/2013 | Sugimae et al. |
| 8,664,286 | B2 | 3/2014 | Yasui et al. |
| 8,765,263 | B2 | 7/2014 | Ho et al. |
| 8,796,164 | B2 | 8/2014 | Restuccia et al. |
| 8,877,848 | B1 | 11/2014 | Wang et al. |
| 9,080,040 | B2 | 7/2015 | Fonseca et al. |
| 9,186,869 | B2 | 11/2015 | Hauber et al. |
| 9,211,176 | B2 | 12/2015 | Natarajan et al. |
| 9,536,513 | B2 | 1/2017 | Wulff et al. |
| 9,566,722 | B2 | 2/2017 | Sitti et al. |
| 9,626,952 | B2 | 4/2017 | Miyawaki et al. |
| 10,119,589 | B2 | 11/2018 | Schaedler et al. |
| 10,160,404 | B2 | 12/2018 | Miyashita et al. |
| 2004/0058083 | A1 | 3/2004 | Lettmann et al. |
| 2004/0222055 | A1 | 11/2004 | Niwa et al. |
| 2007/0088121 | A1 | 4/2007 | Miyawaki et al. |
| 2007/0197713 | A1 | 8/2007 | Miyawaki et al. |
| 2008/0102240 | A1 | 5/2008 | Serra et al. |
| 2008/0251201 | A1 | 10/2008 | Sikkel et al. |
| 2009/0047500 | A1 | 2/2009 | Maeda |
| 2009/0065299 | A1 | 3/2009 | Vito et al. |
| 2009/0148712 | A1 | 6/2009 | Xiao |
| 2009/0183821 | A1 | 7/2009 | Schroeder et al. |
| 2010/0190916 | A1 | 7/2010 | Takata et al. |
| 2011/0060066 | A1 | 3/2011 | Yokota et al. |
| 2012/0085961 | A1 | 4/2012 | Rogunova et al. |
| 2012/0193180 | A1 | 8/2012 | Kawaguchi et al. |
| 2013/0035412 | A1 | 2/2013 | Schmitz et al. |
| 2013/0178558 | A1 | 7/2013 | Rousse et al. |
| 2013/0196105 | A1 | 8/2013 | Karlsen |
| 2014/0061976 | A1 | 3/2014 | Doersam et al. |
| 2014/0224577 | A1 | 8/2014 | Pathak et al. |
| 2014/0363610 | A1 | 12/2014 | Sameoto |
| 2015/0004346 | A1 | 1/2015 | Daley |
| 2015/0004405 | A1 | 1/2015 | Clapper et al. |
| 2015/0183975 | A1 | 7/2015 | Clapper et al. |
| 2015/0218404 | A1 | 8/2015 | Bowles et al. |
| 2016/0017902 | A1 | 1/2016 | Castillo et al. |
| 2016/0264818 | A1 | 9/2016 | Peterson et al. |
| 2016/0309260 | A1 | 10/2016 | Bohm et al. |
| 2017/0240783 | A1 | 8/2017 | Bartholomew et al. |
| 2018/0156296 | A1* | 6/2018 | Alexander .......... B60R 13/0815 |

FOREIGN PATENT DOCUMENTS

| | | | |
|---|---|---|---|
| CN | 101400739 | | 4/2009 |
| CN | 101402800 | | 4/2009 |
| CN | 101463167 | | 6/2009 |
| CN | 101463232 | | 6/2009 |
| CN | 102424714 | | 4/2012 |
| CN | 102443332 | | 5/2012 |
| CN | 102492378 | | 6/2012 |
| CN | 102558840 | | 7/2012 |
| CN | 102604239 | | 7/2012 |
| CN | 102952294 | | 3/2013 |
| CN | 102977416 | | 3/2013 |
| CN | 102977482 | | 3/2013 |
| CN | 103013384 | | 4/2013 |
| CN | 103086319 | | 5/2013 |
| CN | 103289137 | | 9/2013 |
| CN | 103387715 | | 11/2013 |
| CN | 103554924 | | 2/2014 |
| CN | 103724908 | | 4/2014 |
| CN | 104004305 | | 8/2014 |
| CN | 104015406 | | 9/2014 |
| CN | 104098999 | | 10/2014 |
| CN | 104118151 | | 10/2014 |
| CN | 104650403 | | 5/2015 |
| CN | 104673009 | | 6/2015 |
| CN | 104693518 | | 6/2015 |
| CN | 104877191 | | 9/2015 |
| CN | 105273245 | | 1/2016 |
| CN | 105315515 | | 2/2016 |
| CN | 105384888 | | 3/2016 |
| CN | 105754235 | | 7/2016 |
| CN | 105936741 | | 9/2016 |
| CN | 106084867 | | 11/2016 |
| CN | 106284913 | | 1/2017 |
| CN | 106543500 | | 3/2017 |
| CN | 106715558 | | 5/2017 |
| CN | 106866896 | | 6/2017 |
| CN | 106867060 | | 6/2017 |
| CN | 206734213 U | | 12/2017 |
| CN | 108016375 A | * | 5/2018 .......... B32B 15/095 |
| EP | 0255332 | | 2/1988 |
| EP | 0335642 | | 10/1989 |
| EP | 0405300 | | 11/1994 |
| EP | 0728166 | | 8/1996 |
| EP | 0770190 | | 7/1999 |
| EP | 1002008 | | 3/2002 |
| EP | 1658966 | | 5/2006 |
| EP | 1714997 | | 10/2006 |
| EP | 1987089 | | 11/2008 |
| EP | 2164901 | | 3/2010 |
| EP | 2420412 | | 7/2013 |
| EP | 2798006 | | 11/2014 |
| EP | 2922896 | | 9/2015 |
| EP | 3052538 | | 8/2016 |

(56) References Cited

FOREIGN PATENT DOCUMENTS

| | | | |
|---|---|---|---|
| EP | 3080175 | 10/2016 | |
| EP | 3089472 | 11/2016 | |
| EP | 2554091 B1 * | 3/2017 | ......... A47L 15/4209 |
| EP | 3030591 | 6/2017 | |
| EP | 3194483 | 7/2017 | |
| EP | 2464513 | 11/2017 | |
| JP | 51-093770 | 8/1976 | |
| JP | 51-106190 | 9/1976 | |
| JP | 51-106910 | 9/1976 | |
| JP | 02-084329 | 3/1990 | |
| JP | 05-318644 | 12/1993 | |
| JP | 06-73935 | 9/1994 | |
| JP | 07-71519 | 3/1995 | |
| JP | 07-51339 | 6/1995 | |
| JP | 07-196992 | 8/1995 | |
| JP | 08-34089 | 2/1996 | |
| JP | 08-170688 | 7/1996 | |
| JP | 10-503575 | 3/1998 | |
| JP | 2004-286210 | 10/2004 | |
| JP | 2007-127908 | 5/2007 | |
| JP | 2010-526916 | 8/2010 | |
| JP | 2011-089547 | 5/2011 | |
| JP | 2013-181155 | 9/2013 | |
| JP | 2014-109023 | 6/2014 | |
| JP | 2014-162810 | 9/2014 | |
| JP | 2014-529525 | 11/2014 | |
| JP | 2014-224180 | 12/2014 | |
| JP | 2015-160903 | 9/2015 | |
| JP | 2016-056279 | 4/2016 | |
| JP | 2016-141800 | 8/2016 | |
| JP | 2017-039864 | 2/2017 | |
| JP | 2017-082171 | 5/2017 | |
| KR | 1020130096623 | 8/2013 | |
| TW | 201004991 | 2/2010 | |
| TW | 201309762 | 3/2013 | |
| TW | 201341475 | 10/2013 | |
| TW | 201602231 | 1/2016 | |
| WO | 96/04490 | 2/1996 | |
| WO | 03/022568 | 3/2003 | |
| WO | 2008/042883 | 4/2008 | |
| WO | 2012/010844 | 1/2012 | |
| WO | 2015/111786 | 7/2015 | |
| WO | 2016/048780 | 3/2016 | |
| WO | 2016/093339 | 6/2016 | |
| WO | 2017/094266 | 6/2017 | |
| WO | 2018/057570 | 3/2018 | |
| WO | 2018/142370 | 8/2018 | |

OTHER PUBLICATIONS

International Preliminary Report on Patentability dated Oct. 6, 2020 issued in corresponding IA No. PCT/US2019/024596 filed Mar. 28, 2019.

International Search Report and Written Opinion dated Jul. 25, 2019 issued in corresponding IA No. PCT/US2019/032421 filed May 15, 2019.

International Preliminary Report on Patentability dated Nov. 17, 2020 issued in corresponding IA No. PCT/US2019/032421 filed May 15, 2019.

Gilleo, Dr. Ken, et al. "Thermoplastic Adhesives—The Attachment Solution for Multichip Modules." IEPS, Sep. 1993, pp. 232-242.

Kinloch, A.J. "Toughening Epoxy Adhesives to Meet Today's Challenges." Materials Research Society Bulletin, vol. 28, 2003, pp. 445-448.

International Search Report and Written Opinion issued in corresponding IA No. PCT/US2018/023119 dated Dec. 21, 2018.

International Search Report and Written Opinion issued in corresponding IA No. PCT/US2017/052419 dated Jan. 8, 2018.

Pattantyus-Abraham et al. "Recent Advances in Nanostructured Biomimetic Dry Adhesives", Front Bioeng Biotechnol, 2013, vol. 1, 22.

International Report on Patentability issued in corresponding IA No. PCT/US2017/052419 dated Apr. 4, 2019.

International Preliminary Report on Patentability dated Sep. 22, 2020 issued in corresponding IA No. PCT/US2018/023119 filed Mar. 19, 2018.

Chen et al., "Research Progress in Gradient Polymer Materials," Materials Reports, vol. 20, Issue 9, pp. 59-61, Sep. 2006.

Wang et al, "Common Knowledge: Metal Materials and the Heat Treatment Thereof," p. 217, Feb. 2009.

Japanese Industrial Standards JIS G3141:2017.

Japanese Opposition No. 2022-700807 filed against JP Patent No. 7022118, 38 pages.

Li et al., "Structural Mechanical Property Analysis of Embedded Co-Cured Damping Composites," Chinese Master's Theses Fulltext Database, Engineering Science and Technology, vol. 1, Issue 6, Jun. 2016, p. 63.

Li et al., "Dynamic Property Analysis of Embedded Co-Cured Gridded Damping Structure Composites," Journal of Ordnance Equipment Engineering, vol. 37, No. 3, Mar. 2016, pp. 132-137.

* cited by examiner

FIG. 2A
Normal "total coverage" ML CLD - side view

FIG. 2B
75% adhesive coverage ML CLD (0.5" strips, 0.25" gaps) - side view

FIG. 2C
50% adhesive coverage ML CLD (0.5" strips, 0.5" gaps) - side view

FIG. 8 ical No. PCT/US2019/032421 which was published in
PARTIAL COVERAGE MULTILAYER DAMPING LAMINATE

CROSS REFERENCE TO RELATED APPLICATION

The present application is a 371 of International Application No. PCT/US2019/032421 which was published in English on Nov. 21, 2019, and claims the benefit of U.S. Provisional Patent Application No. 62/672,855 filed on May 17, 2018, both of which are incorporated herein by reference in their entireties.

FIELD

The present disclosure relates generally to multilayer damping laminates useful for dissipating vibrations.

BACKGROUND

There is a need in many markets, e.g., the automotive market, the home appliance market, and the electronics market, for the reduction of undesired vibrations and associated noise generation. As an example, the automotive industry is trending towards an increased adoption of lighter weight vehicles. As such, there has been an increased use of lighter weight aluminum and polymer materials. The use of these designs and materials, however, leads to additional issues relating to vehicle vibration and vibration-related noise.

Generally, the noise and vibration issues have been managed through two approaches: the stiffening of the structure geometry to be more resistant to vibration, and the damping of the structure to reduce the vibration amplitude. Along with these solutions, acoustic technologies can be used to absorb, reflect, and isolate sound waves from their source, for example before they reach a passenger in an automotive cabin.

Structural damping approaches can involve the application of damping tapes or laminates that include a stiffening or constraining carrier material and a damping material. These constraining and damping materials are typically configured in a stacked arrangement that can be adhered to a structure to absorb and dissipate vibrational energy. In order to achieve desired vibration damping characteristics however, these damping tapes typically are relatively thick, include large amounts of costly adhesive, and can significantly add to the overall weight of the system to which they are applied. Accordingly, a need remains for damping laminates with improved vibrational reduction and/or a decrease in material requirements that are also cost- and weight-effective.

SUMMARY

In one embodiment, the disclosure is to a multilayer damping laminate having a composite loss factor at about 200 Hz that is greater than about 0.05. The multilayer damping laminate may comprise at least one constraining layer that may have a thickness ranging from about 5 μm to about 3000 μm. In many embodiments, at least one constraining layer comprises a metal. The multilayer damping laminate may further comprise a discontinuous damping layer that having a thickness ranging from about 2 μm to about 5000 μm. In many embodiments, the discontinuous damping layer is directly adjacent to at least one constraining layer. The discontinuous damping layer may comprise one or more damping material regions and one or more gap regions, wherein a percent coverage of the discontinuous damping layer by the one or more damping material regions is less than about 99%. In many embodiments, the percent coverage of the discontinuous damping layer by the one or more damping material regions is less than 90%. In other embodiments, the percent coverage of the discontinuous damping layer by the one or more damping material regions is less than about 80%. In many embodiments, the percent coverage of the discontinuous damping layer by the one or more damping material regions is less than about 70%. In still other embodiments, the percent coverage of the by the one or more damping material regions is greater than about 50%. In many embodiments, an average width of the one or more gap regions is less than about 0.200 cm. In many embodiments, the multilayer damping laminate further comprises a liner layer connected to the first damping layer opposite at least one constraining layer. In many embodiments, the discontinuous damping layer is a first discontinuous damping layer, at least one constraining layer is an internal constraining layer, and the multilayer damping laminate further comprises at least one additional discontinuous damping layer and an external constraining layer. In some embodiments, at least a portion of the internal constraining layer may be disposed between the first discontinuous damping layer and at least one additional discontinuous damping layer, and at least a portion of at least one additional discontinuous damping layer may be disposed between the internal constraining layer and the external constraining layer. In many embodiments, at least one additional discontinuous damping layer comprises one or more additional discontinuous layer damping material regions and one or more additional discontinuous damping layer gap regions. The percent coverage of the external constraining layer by the one or more additional discontinuous damping layer damping material regions may be less than about 99%.

In another embodiment, the disclosure is to a system comprising a multilayer damping laminate as described above. The system further comprises a base substrate connected to the discontinuous damping layer of the multilayer damping laminate.

In another embodiment, the disclosure is to a method of reducing a vibration of a base substrate. The method comprises providing a base substrate that is subject to a vibration. The method further comprises connecting the base substrate to the discontinuous damping layer of a multilayer damping laminate as described above.

BRIEF DESCRIPTION OF DRAWINGS

The disclosure references the appended drawings, wherein like numerals designate similar parts.

DETAILED DESCRIPTION

The present disclosure generally relates to multilayer damping laminates that, when employed for example on a base substrate subject to vibration, provide advantageous improvements in stiffness and reductions in vibration while reducing the amount of damping material included in the laminates. For example, for a flexible or non-rigid structure, it is beneficial to minimize the frequency and/or amplitude of any vibrations of the structure. Such vibrational reductions beneficially increase the stability of the structure, reduce fatigue and stress, lengthen operational lifetime, and decrease undesired vibration side effects, such as the generation of noise or the discomfort of vehicle passengers.

Conventionally, damping treatments such as laminates or tapes include constraining elements and damping elements configured to be attached to vibrating structures. These treatments, referred to as constrained layer damping treatments, can decrease the occurrence and intensity of vibrations observed with the structure to which the treatments are attached. In these conventional laminates however, the constraining layers and the damping layers of the treatment are typically applied together in a stacked configuration wherein the stiffening and damping layers are substantially coextensive with one another. In other words, the layers of conventional constrained damping devices may be each substantially continuous sheets of material having uniform thickness and no intentional holes or gaps.

Through the use of discontinuous damping layers in multilayer damping laminates, advantageous improvements in damping performance can be surprisingly realized. In particular, it has been found that the effectiveness and efficiency of constrained layer damping laminates can be enhanced if the damping layers are composed of one or more gap regions, such that one or more damping material regions of the layers do not provide complete coverage of the constraining layers of the laminate. Furthermore, the discontinuous nature of the disclosed damping layers allows them to be manufactured using less damping material. This can have a significant impact in advantageously reducing the production cost of these damping treatments. The decrease in materials can allow an end user to achieve an enhanced effect in damping a structure, while reducing the total damping product mass applied per unit surface area of the structure.

Discontinuous Damping Layers

In one embodiment, a multilayer damping laminate having improved damping performance is disclosed. The damping performances of a damping laminate and its component damping layers can be described in terms of their composite loss factor (CLF) properties. The composite loss factor of a material or device is a measure of its ability to convert vibrational energy to thermal energy. As a general practice, the materials or compositions of individual layers selected as being highly damping can have composite loss factors of 0.8 or larger. In a layered construction, the total composite loss factor of the overall construction is generally considered effective at values of 0.05 or larger. The composite loss factor of the multilayer damping laminate can be determined, for example, as described in the standard protocol ASTM E756-05 (2017). The disclosed multilayer damping laminate described herein can have a composite loss factor at 200 Hz that is greater than about 0.050, e.g., greater than about 0.060, greater than about 0.070, greater than about 0.080, greater than about 0.090, greater than about 0.100, greater than about 0.200, greater than about 0.300, greater than about 0.400, or greater than about 0.500.

In many embodiments, the multilayer damping laminate comprises at least one constraining layer and at least one discontinuous damping layer. The discontinuous damping layer includes one or more damping material regions and one or more gap regions. The damping material regions are portions of the discontinuous damping layer that each comprise one or more damping materials selected for high elasticity, anelasticity, viscosity, and/or viscoelasticity. The gap regions are portions of the discontinuous damping layer that each may comprise one or more materials having lower elasticity, anelasticity, viscosity, and/or viscoelasticity that those of the damping material regions. Each of the one or more gap regions of the damping layer may be bound by the one or more damping material regions, one or more edges of the discontinuous damping layer, or a combination thereof. The presence of the one or more gap regions in the damping layer causes the one or more damping material regions to provide incomplete coverage of at least one constraining layer, e.g., the damping material regions are not substantially coextensive with at least one constraining layer. As used herein, the terms "coverage" and "percent coverage" refer to the fraction of the constraining layer area covered by a projection of the damping layer regions onto the plane of the constraining layer. This leads to the benefit of a reduction of materials and a resulting reduction in mass in the multilayer damping laminates. Surprisingly, certain discontinuous damping laminate layer configurations also provide the advantageous benefit of increased damping performance.

The percent coverage of the discontinuous damping layer by the damping material regions can, for example, range from about 50% to about 99%, e.g., from about 60% to about 90%, from about 70% to about 86%, from about 72% to about 90%, from about 75% to about 93%, from about 78% to about 96%, or from about 80% to about 99%. In terms of upper limits, the percent coverage of at least one constraining layer by the damping material regions can be less than about 99%, e.g., less than about 96%, less than about 93%, less than about 90%, less than about 86%, less than about 83%, less than about 80%, less than about 78%, less than about 75%, or less than about 72%. In terms of lower limits, the percent coverage of at least one constraining layer by the damping material regions can be greater than about 50%, e.g., greater than about 55%, greater than about 60%, greater than about 65%, greater than about 70%, greater than about 72%, greater than about 75%, greater than about 78%, greater than about 80%, greater than 83%, greater than about 86%, greater than about 90%, greater than about 93%, or greater than about 96%. The percent coverage of at least one constraining layer by the damping material regions may also be less than or equal to 90%. Higher percent coverages, e.g., greater than about 99%, and lower percent coverages, e.g., less than 50%, are also contemplated. The limits for the higher percent coverages and lower percent coverages may vary due to factors that include, but are not limited to, specific geometry, thickness, and adhesive rheology.

Figure 1A:
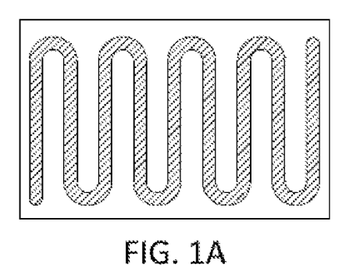
FIG. 1 illustrates exemplary configurations of one or more damping material regions and one or more gap regions in the discontinuous damping layers of disclosed multilayer damping laminate.
Figure 1B:
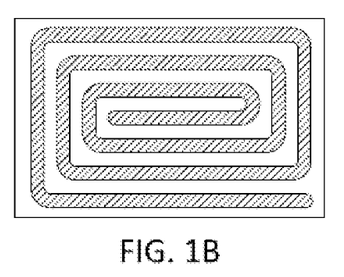

The number and shape of the damping material regions and gap regions of the discontinuous damping layer can vary widely. In some aspects, the damping layer may provide a pattern or other configuration. In certain aspects, the damping layer includes a single damping material region and a single gap region, that are together arranged in one more serpentine (FIG. 1A) or spiraling (FIG. 1B) configurations to maintain small region widths. For example, the damping material region can have a serpentine shape within the gap region, or the gap region can have a serpentine shape within the damping region. In other examples, the damping material region can have one or more spiral-shaped portions within the gap region, or the gap region can have one or more spiral-shaped portions within the damping material region. In certain aspects, the damping layer includes a single damping material region and multiple gap regions. The single damping material region and multiple gap regions can, for example, be arranged in a crosshatched configuration in which the damping material region forms the borders of the hatching and the gap regions form the interiors of the hatching. In other aspects, the damping layer may alternatively lack a pattern or other configuration. In this non-pattern, there may be gaps and damping material region(s) with irregular shapes and/or spacing. In other embodiments, there may be a combination of both configurations/portions and non-patterns. Alternatively, the shape the patterns for the damping region and gap region in the discontinuous damping layer can be generalized in the following manner: 1) the damping regions can be a union of infinitely many disjoint subsets Di of the discontinuous damping layer and the gap regions are the complement of the union of infinitely many disjoint subsets Di; or 2) alternatively, the gap regions can be an union of infinitely many disjoint subsets Gi of the discontinuous damping layer and the damping region can be the complement of the union of infinitely many disjoint subsets Gi. For these scenarios, i is an indexing variable ranging from 1 to infinity. Further, the disjoint subsets Di (or Gi) may be closed and connected, or closed and locally connected. Additionally, the disjoint subsets Di (or Gi) can be the union of infinitely many non-disjoint non-empty connected subsets. Examples of the connected subset Di (or Gi) are the following. The subset Di can be any n-sided polygon that can be convex, concave, equilateral, equiangular, spherical, a periogon, self-intersecting or the Euclidean realization of an abstract polytope. Here, n is the number of sides of the polygon and it can range from 1 to infinity. Examples may include, but are not limited to, any regular convex polygon, regular or skewed quadrilateral that can encompass regular or skewed paralleglograms, trapeziums, rhombus, kites, self-intersecting quadrilaterals, antiparallegorrams, star polygons, crossed rectangles, Saccheri quadrilaterals, and any closed Euclidean set that can be either convex or concave. The subsets Di (or Gi) can be arranged in any pattern such their intersection in any manner of consideration is a null-set. Examples can include, but are not limited to, parallel stacking of D is separated by a gap region (or G is separated by a damping region), Euclidean tilings, uniform tilings, aperiodic tilings, spiral tilings, convex or concave uniform tilings to name a few.

Figure 1C:
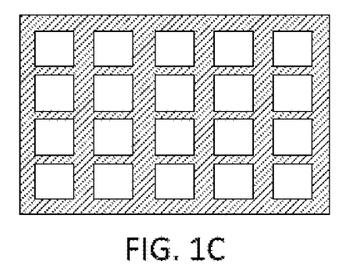
Figure 1D:
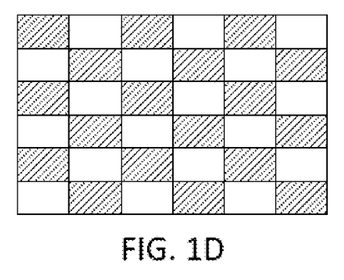

In certain aspects, the damping layer includes a single gap region and multiple damping material regions. The single gap region and multiple damping material regions can, for example, be arranged in a crosshatched configuration (FIG. 1C) in which the gap material region forms the borders of the hatching and the damping material regions form the interiors of the hatching. In other examples, the damping material region forms the borders of the hatching and the gap regions form the interiors of the hatching. In certain aspects, the damping layer includes multiple damping material regions and multiple gap regions, that are together arranged in a checkerboard-like pattern (FIG. 1D); a series of straight (FIG. 1E), angled, zigzag (FIG. 1F), or curved lines; circles; or any combination of polygons. The arrangement of the one or more damping material regions and the one or more gap regions can be in a pattern of one or more repeating blocks, or can lack such a pattern. In some embodiments, the damping material regions may have a substantially random configuration.

Figure 1E:
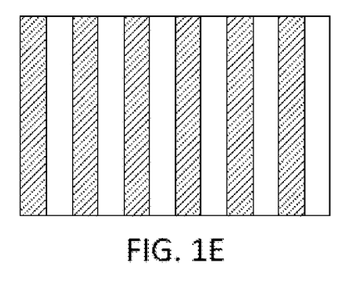
Figure 1F:
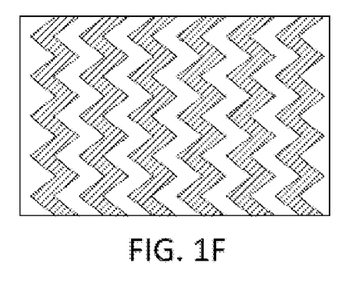

In some embodiments, and as shown in FIG. 1E, the damping material regions and gap regions of the discontinuous damping layer have substantially rectangular shapes that are substantially parallel to one another. The rectangular shapes of damping material regions can have similar or different average widths. The rectangular shapes of the damping material regions can have similar or different lengths. The rectangular shapes of the gap regions can have similar or different widths. The rectangular shapes of the gap regions can have similar or different lengths. When applied to the surface of a structure or substrate that is subject to vibrations, the damping material regions can, for example, be substantially parallel or substantially perpendicular to the structure or substrate. As an example, when a disclosed damping laminate is applied to a vibrating beam, the damping material regions of the discontinuous damping layer of the laminate can be substantially parallel or substantially perpendicular to the beam.

As used herein, reference to the width of a region is used to denote the distance from a point on the lengthwise border of a region to the closest point on an opposite border of the region, wherein the lengthwise border is the border having the largest path length. As used herein, reference to the average width of a region is used to denote the average of the width as measured at all points along the lengthwise border. As used herein, reference to the average width of multiple regions is used to denote the average of the average widths of all such regions. For example, average width of the one or more gap regions of the discontinuous damping layer is the average of the average widths of each gap region in the damping layer.

The average width of the gap regions of the discontinuous damping layer can, for example, range from about 0.005 cm to about 1.000 cm, e.g., from about 0.010 cm to about 0.900 cm, from about 0.010 cm to about 0.800 cm, from about 0.010 cm to about 0.700 cm, from about 0.010 cm to about 0.600 cm, from about 0.010 cm to about 0.500 cm, from about 0.010 cm to about 0.400 cm, from about 0.300 cm to about 0.124 cm, from about 0.010 cm to about 0.200 cm, e.g., from about 0.010 cm to about 0.124 cm, from about 0.029 cm to about 0.143 cm, from about 0.048 cm to about 0.162 cm, from about 0.067 cm to about 0.181 cm, or from about 0.086 cm to about 0.200 cm. In terms of upper limits, the average width of the gap regions can be less than about 0.200 cm, e.g., less than about 0.181 cm, less than about 0.162 cm, less than about 0.143 cm, less than about 0.124 cm, less than about 0.105 cm, less than about 0.086 cm, less than about 0.067 cm, less than about 0.048 cm, or less than about 0.029 cm. In terms of lower limits, the average width of the gap regions can be greater than 0.010 cm, e.g., greater than about 0.029 cm, greater than about 0.048 cm, greater than about 0.067 cm, greater than about 0.086 cm, greater than about 0.105 cm, greater than about 0.124 cm, greater than about 0.143 cm, greater than about 0.162 cm, or greater than about 0.181 cm. Larger widths, e.g., greater than about 0.200 cm, and smaller widths, e.g., less than about 0.010 cm, are also contemplated.

The average width of the damping material regions of the discontinuous damping layer can, for example, range from about 0.050 cm to about 1.000 cm, e.g., from about 0.050 cm to about 0.900 cm, from about 0.050 cm to about 0.800 cm, from about 0.050 cm to about 0.700 cm, from about 0.050 cm to about 0.620 cm, from about 0.145 cm to about 0.715 cm, from about 0.240 cm to about 0.810 cm, from about 0.335 cm to about 0.905 cm, or from about 0.430 cm to about 1.000 cm. In terms of upper limits, the average width of the damping material regions can be less than about 1.000 cm, e.g., less than about 0.905 cm, less than about 0.810 cm, less than about 0.715 cm, less than about 0.620 cm, less than about 0.525 cm, less than about 0.430 cm, less than about 0.335 cm, less than about 0.240 cm, or less than about 0.145 cm. In terms of lower limits, the average width of the damping material regions can be greater than about 0.050 cm, e.g., greater than about 0.145 cm, greater than about 0.240 cm, greater than about 0.335 cm, greater than about 0.430 cm, greater than about 0.620 cm, greater than about 0.715 cm, greater than about 0.810 cm, or greater than about 0.905 cm. The average width of the damping material regions of the discontinuous damping layer can, for example, be less than or equal to about 1.000 cm. Larger widths, e.g., greater than about 1.000 cm, and smaller widths, e.g., less than about 0.050 cm, are also contemplated.

The thickness of the discontinuous damping layer can, for example, range from about 2 μm to about 5000 μm, e.g., from about 2 μm to about 220 μm, from about 4.4 μm to about 480 μm, from about 9.6 μm to about 1000 μm, from about 21 μm to about 2300 μm, or from about 46 μm to about 5000 μm. In terms of upper limits, the thickness of the discontinuous damping layer can be less than about 5000 μm, e.g., less than about 2300 μm, less than about 1000 μm, less than about 480 μm, less than about 220 μm, less than about 100 μm, less than about 46 μm, less than about 21 μm, less than about 9.6 μm, or less than about 4.4 μm. In terms of lower limits, the thickness of the discontinuous damping layer can be greater than about 2 μm, greater than about 4.4 μm, greater than about 9.6 μm, greater than about 21 μm, greater than about 46 μm, greater than about 100 μm, greater than about 220 μm, greater than about 480 μm, greater than about 1000 μm, or greater than about 2300 μm. Larger thicknesses, e.g., greater than about 5000 μm, and smaller thicknesses, e.g., less than about 2 μm, are also contemplated.

In some embodiments, the damping material of each of the damping material regions can include elastic, an elastic, viscous, and/or viscoelastic materials. For instance, the damping material can be compressible and can comprise a restorative force. In an aspect, the damping materials can include rubber, plastic, e.g., nylon, leather, fabric, foam, sponge, gel, or the like. In some embodiments, the damping material includes one or more adhesives. In some embodiments, the damping material includes one or more pressure sensitive adhesives. In many embodiments, the adhesive may be acrylic, rubber, silicone, hybrid, butyl, polyurethane, olefin, polyester or a combination of these adhesives.

In some embodiments, the damping materials can include one or more silicone adhesives. The silicone adhesives can include polyorganosiloxane dispersions or gums, such as polydimethylsiloxanes, polydimethyl/methylvinyl siloxanes, polydimethyl/methylphenyl siloxanes, polydim- ethyl/diphenyl siloxanes, and blends thereof. The silicone adhesives can include silicone resins, such as MQ resins or blends of resins. Non-limiting examples of such silicone adhesive compositions which are commercially available include adhesives 7651, 7652, 7657, Q2-7406, Q2-7566, Q2-7735 and 7956, all available from Dow Corning (Midland, Mich.); SILGRIP™ PSA518, 590, 595, 610, 915, 950 and 6574 available from Momentive Performance Materials (Waterford, N.Y.); and KRT-009 and KRT-026 available from Shin-Etsu Silicone (Akron, Ohio).

In other embodiments, damping materials can comprise one or more rubber-based adhesives. Rubber-based adhesive comprised of combinations of styrene block copolymers and various tackifying resins, oils, fillers, pigments and antioxidants. A wide array of rubber agent(s) can be used in the adhesives of the present subject matter tapes. Nonlimiting examples of suitable rubber agents include but are not limited to polymers or copolymers of styrene-butadiene (SB), styrene-butadiene-styrene (SBS), styrene-isoprene (SI), styrene-isoprene-styrene (SIS), random styrene-butadiene (SBR), styrene-butadiene-isoprene multi-block (SBIBS), or polyisoprene. In some embodiments, fully and partially hydrogenated rubber agents can be used. Combinations of these agents described above can also be used. Examples of suitable styrene-butadine-styrene (SBS) which are commercially available include KRATON D1101 and KRATON D1118 from Kraton Performance Polymers and VECTOR 2518D from Dexco Polymers. Examples of suitable styrene-isoprene-styrene (SIS) include KRATON D1107P and VECTOR 411A. An example of a suitable styrene-butadiene-isoprene multi-block (SBIBS) is KRATON 56455. Kraton GRP-6924 is an example of a hydrogenated styrene block copolymer. The styrene-butadiene copolymer(s) component of the adhesive compositions used in the present subject matter may be block or multi-block copolymers having the general configuration: A-B-A or A-B-A-B-A-B wherein the non-elastomeric polymer blocks A are styrene, while the elastomeric polymer blocks B are butadiene or butadiene which is partially or substantially hydrogenated. The polymeric blocks may be linear or branched. Typical branched structures may contain an elastomeric portion with at least three branches which can radiate out from a central hub or can be otherwise coupled together.

Further, combinations of at least one silicone adhesive and at least one rubber adhesive may be used in the damping materials.

In other embodiments, the damping materials may comprise a wide array of solid resin(s). The term "solid resin" as used herein refers to any resin which is solid at room/ambient temperature (about 23° C.) and which is compatible with the other components of the adhesive. Nonlimiting examples of such include aliphatic hydrocarbons such as from C5 to C9, hydrogenated ester rosins, partially hydrogenated ester rosins, aromatic modified ester resins, pentaerythritol resins, hydrogenated pentaerythritol resins, terpene resins, glycerol ester rosin resins, pentaerythritol tall oil, terpene phenolics, glycerol ester rosin resin, and combinations thereof. Nonlimiting examples of suitable aliphatic hydrocarbons used as solid resin(s) include ESCOREZ 1310 and ESCOREZ 2101 available from Exxon Mobile. Examples of a suitable hydrogenated ester rosin is FORAL 85 available from several suppliers such as Eastman Chemical and HERCOLYN D from Pinova. An example of a suitable partially hydrogenated ester rosin is FORALYN from Eastman Chemical. An example of a suitable aromatic modified ester resin is PICCOTAC 7590 from Eastman Chemical. An example of a suitable pentaerythritol resin is PEXALYN 9100 from Pinova. An example of a suitable hydrogenated pentaerythritol resin is PENTALYN H from Eastman Chemical. An example of a suitable pentaerythritol tall oil resin is SYLVALITE RE 105L from Arizona Chemical. An example of a suitable terpene phenolic is PICCOLYTE A115 from Eastman Chemical. An example of a commercially available glycerol ester gum rosin resin is RESINALL 625 available from Resinall Corporation.

In yet other embodiments, the damping materials may also comprise a variety of liquid resin(s) used in the adhesive(s) of the present subject matter sealing tapes. The term "liquid resin" as used herein refers to any resin which is liquid at room/ambient temperature (about 23° C.) and which is compatible with the other components of the adhesive. A variety of liquid resin(s) can be used in the adhesives of the present subject matter sealing tapes. Non-limiting examples of such liquid resin(s) include hydrogenated resin ester, terpene resins, low molecular weight hydrocarbons such as for example C5 hydrocarbons, and combinations thereof. An example of a suitable terpene resin is SYLVARES TR A25 available from Arizona Chemical. An example of a suitable C5 hydrocarbon is WINGTAC 10 available from numerous suppliers. An example of a suitable modified rosin resin for use in the adhesive(s) of the present subject matter sealing tapes is STAYBELITE-E ESTER 3-E which is an ester of hydrogenated rosin. STAYBELITE-E is available from Eastman Chemical.

Further, combinations of at least one liquid resin and at least one solid resin may be used in the damping materials.

In many embodiments, the damping material regions comprise a pressure sensitive adhesive. In some embodiments, the damping and bonding layers can comprise a butyl rubber or polyisobutylene based pressure sensitive adhesive. These adhesives can be formulated from mixtures of various molecular weight butyl rubber or polyisobutylene polymers or oligomers. Non-limiting examples of butyl rubber grades useful for formulating these adhesives include Exxon Butyl 065, Butyl 365, Chlorobutyl 1065, Chlorobutyl 1055, Bromobutyl 2222 and Exxpro Specialty Elastomer 3433 from ExxonMobil Chemical and polyisobutylene grade Oppanol N50 from BASF. These polymers are often blended with a low molecular weight grade of polyisobutylene such as TPC 750, TPC 1600 or TPC 3500 from TPC Group. Additionally, these adhesive can be formulated with a wide variety of tackifying resins including C5-C9 hydrocarbon tackifiers as well as polyterpene resins. Suitable hydrocarbon tackifying resins include ESCOREZ 1310 and ESCOREZ 2101 available from ExxonMobil. Examples of polyterpene resins include Piccolyte A115 and Piccolyte S25 available from Pinova. In addition to the above listed components, butyl rubber and polyisobutylene based adhesives may also contain additives such as, but not limited to, plasticizing oils, antioxidants, pigments and fillers. In the case of butyl and halo-butyl rubber based adhesives, curing agents may be added which allow for cross-linking. Examples of these cross-linkers are zinc oxide, phenol resins and others known in the art. These and other examples of additives are available in "Handbook of Pressure Sensitive Adhesive Technology" Chapter 14, Higgins, J. J. et al.

The damping materials, in some cases, can comprise an acrylic-based or silicone-based monomer. In some embodiments, the damping materials comprise one or more acrylic-based monomers selected from the group consisting of methyl acrylate, ethyl acrylate, butyl acrylate, 2-ethylhexyl acrylate, isooctyl acrylate, isobornyl acrylate, isononyl acrylate, isodecyl acrylate, methylacrylate, methyl methacrylate, methylbutyl acrylate, 4-methyl-2-pentyl acrylate, butyl methacrylate, 2-ethylhexyl methacrylate, and isooctyl methacrylate. Useful alkyl acrylate esters include n-butyl acrylate, 2-ethyl hexyl acrylate, isooctyl acrylate. In one embodiment, the acrylic ester monomer is polymerized in the presence of a vinyl ester such as vinyl acetate, vinyl butyrate, vinyl propionate, vinyl isobutyrate, vinyl valerate, vinyl versitate, and the like. The vinyl ester can be present in a total amount of up to about 35 wt %, based on total weight of the monomers forming the acrylate main chain. In one embodiment, an acrylic ester monomer is copolymerized with an unsaturated carboxylic acid. The unsaturated carboxylic acid can include, among others, acrylic acid, methacrylic acid, itaconic acid, beta carboxy ethyl acrylate and the like.

In some embodiments, the damping materials comprise one or more silicone-based monomers selected from the group consisting of siloxanes, silane, and silatrane glycol. In some embodiments, the damping materials comprise one or more silicone-based monomers selected from the group consisting of 1,4-bis[dimethyl[2-(5-norbornen-2-yl)ethyl]silyl]benzene; 1,3-dicyclohexyl-1,1,3,3-tetrakis(dimethylsilyloxy)disiloxane; 1,3-dicyclohexyl-1,1,3,3-tetrakis(dimethylvinylsilyloxy)disiloxane; 1,3-dicyclohexyl-1,1,3,3-tetrakis[(norbornen-2-yl)ethyldimethylsilyloxy]disiloxane; 1,3-divinyltetramethyldisiloxane; 1,1,3,3,5,5-hexamethyl-1,5-bis[2-(5-norbornen-2-yl)ethyl]trisiloxane; 1,1,3,3-tetramethyl-1,3-bis[2-(5-norbornen-2-yl)ethyl]disiloxane; 2,4,6,8-tetramethyl-2,4,6,8-tetravinylcyclotetrasiloxane; N-[3-(trimethoxysilyl)propyl]-N'-(4-vinylbenzyl) ethylenediamine; and 3-[tris(trimethylsiloxy)silyl]propyl vinyl carbamate.

The damping materials, in some cases, can comprise a silicone polymer, an acrylic polymer, or a methacrylic polymer. Suitable acrylic polymers include, but are not limited to, S2000N, S692N, AT20N, XPE 1043, and XPE 1045, all available from Avery Dennison (Glendale, Calif.); and H9232 available from BASF (Florham Park, N.J.). In one embodiment, the acrylic polymer composition is blended with multiblock copolymers such as styreneisoprene-styrene (SIS), styrene-ethylenebutylene-styrene (SEBS) and the like in an amount of up to about 30% by dry weight of the polymer. Examples of useful triblocks are available from Kraton Polymer Inc. (Houston, Tex.). Multiblock polymers can be useful in modifying the damping peak and other physical properties of the acrylic composition. Other damping materials may comprise a rubber polymer. Suitable rubber polymers include, but are not limited to, elastomers, butyl rubber, styrenic block copolymer (known as SBCs, from example, Kraton), silicone rubber, nitrile rubber, isoprene, butadiene. In some embodiments, the rubber polymer composition may be blended with an acrylic polymer and/or acrylic polymer.

A wide array of functional groups can be incorporated in a polymer of the damping materials. The functional groups can be incorporated into the polymer formed from the acrylic-based monomer or the silicon-based monomer, for example as end segments. Representative functional groups include, without limitation, hydroxy, epoxy, cyano, isocyanate, amino, aryloxy, aryalkoxy, oxime, aceto, epoxyether and vinyl ether, alkoxymethylol, cyclic ethers, thiols, benzophenone, acetophenone, acyl phosphine, thioxanthone, and derivatives of benzophenone, acetophenone, acyl phosphine, and thioxanthone.

Functional groups that have hydrogen-bonding capability are well known and include carboxyl, amide, hydroxyl, amino, pyridyl, oxy, carbamoyl and mixtures thereof. In some embodiments, an acrylic polymer backbone of the damping materials includes the polar comonomers vinyl pyrrolidone and acrylic acid. Examples of other monomers with hydrogen-bonding functionality include methacrylic acid, vinyl alcohol, caprolactone, ethylene oxide, ethylene glycol, propylene glycol, 2-hydroxyethyl acrylate, N-vinyl caprolactam, acetoacetoxyethyl methacrylate and others.

In some embodiments, the damping materials comprise one or more co-monomers bearing a functionality that can be further crosslinked. Examples of crosslinkable co-monomers include (meth) acrylic acid, 2-hydroxyethyl acrylate, glycidyl methacrylate, itaconic acid, allyl glycidyl ether and the like, and mixtures thereof. Functional moieties, such as those described above, can be used to crosslink polymer chains, to attach the high side chains to the backbone, or both.

The damping materials can further comprise a crosslinker, which can vary widely. Examples of suitable crosslinkers include multifunctional acrylates and methacrylates, such as diacrylates (ethylene glycol diacrylate, propylene glycol diacrylate, polyethylene glycol diacrylate, and hexanediol diacrylate), dimethacrylates (ethylene glycol diacrylate, diethylene glycol dimethacrylate, and 1,3 butane glycol dimethacrylate), triacrylates (trimethylolpropane trimethacrylate, ethoxylated trimethylolpropane triacrylate, and pentaerythritol triacrylate), and trimethacrylates (pentaerythritol trimethacrylate and trimethylolpropane trimethacrylate), as well as divinyl esters, such as divinylbenzene, divinyl succinate, divinyl adipate, divinyl maleate, divinyl oxalate, and divinyl malonate.

Additional crosslinkers can be employed to form crosslinks in a silicone-based matrix. In some embodiments, a peroxide crosslinker, such as dibenzoylperoxide, is suitable. In some embodiments, the crosslinker is a compound that contains silicon-hydride functionality. Non-limiting examples of such crosslinkers include PEROXAN BP 50W, PEROXAN BIC, and PEROXAN Bu, all available from Pergan (Bocholt, Germany); LUPEROX® A75 and A98 commercially available from Arkema (King of Prussia, Pa.); and PERKADOX® CH-50 and PD 50SPS from Akzo Nobel (Chicago, Ill.). Crosslinking can be facilitated and/or promoted by heating or other techniques generally depending upon the chemical system employed.

Other exemplary chemical crosslinkers that can be used in the damping materials include, but are not limited to, di-, tri- or poly-isocyanates with or without a catalyst (such as dibutyltin dilaureate); ionic crosslinkers; and di-, tri- or poly-functional aziridines. Illustrative, non-limiting examples of commercially available chemical crosslinkers include aluminum acetyl acetonate (AAA) available from NOAH Technologies (San Antonio, Tex.); TYZOR® available from DuPont (Wilmington, Del.); XAMA® available from Bayer (Pittsburgh, Pa.); and PAPI™ and VORONATE™, available from Dow Chemical.

The damping materials can optionally comprise one or more tackifiers or resins, and these tackifiers (when employed) can vary widely. In some cases, the tackifier of the damping materials includes a single tackifier. In other cases, the tackifier comprises a mixture of multiple tackifier products. Suitable commercial tackifiers include (but are not limited to), for example, hydrogenated DCPD resins such as HD1100, HD1120 from Luhua (China), and E5400 from Exxon Mobil (Houston, Tex.). Other suitable hydrogenated resins include fully hydrogenated resins such as REGALITE™ S1100, R1090, R1100, C100R, and C100W from Eastman (Kingsport, Tenn.); and fully hydrogenated C9 resins QM-100A and QM-115A from Hebei Qiming (China).

The damping materials can also optionally comprise one or more plasticizers, and these plasticizers (when employed) can vary widely. In some embodiments, the plasticizer has a high molecular weight and/or a high viscosity. In some cases, the plasticizer includes a single plasticizer. In other cases, the plasticizer comprises a mixture of multiple plasticizer products. Suitable commercial plasticizers include (but are not limited to), for example, KN 4010 and KP 6030 from Sinopec (Beijing, China); Claire F55 from Tianjin (China); F550 from Formosa Petrochemical (China), and various polyisobutene products.

The damping materials can optionally comprise one or more waxes, and these waxes (when employed) can vary widely. In some cases, the wax includes a single wax. In other cases, the wax comprises a mixture of multiple wax products. The wax can have a higher molecular weight so as to advantageously improve oil migration. Exemplary waxes include microcrystalline waxes, paraffin waxes, hydrocarbon waxes, and combinations thereof. Suitable commercial waxes include (but are not limited to), for example, Sasol wax 3971, 7835, 6403, 6805, and 1800 from Sasol (Houston, Tex.); A-C1702, A-C6702, A-05180 from Honeywell (Morristown, N.J.); and MICROWAX™ FG 7730 and MICROWAX™ FG 8113 from Paramelt (Muskegon, Mich.).

The damping materials can comprise one or more powder additives selected to improve damping performance across a broader range of operating temperatures. In some embodiments, the damping materials comprise one or more acrylic-based powder additives. Suitable commercially available acrylic-base powder additives include SPHEROMERS® CA 6, SPHEROMERS® CA 10, SPHEROMERS® CA 15, KRATON® SBS 1101 AS, KRATON® SB 1011 AC, KRATON® TM 1116 Polymer, KRATON® D1101 A Polymer, KRATON® D1114 P Polymer KRATON® D1114 P Polymer, Zeon NIPOL® 1052, Zeon NIPOL®1041, and Zeon NIPOL®NS 612. In some embodiments, the damping materials comprise one or more silicone-based powder additives. Suitable commercially available silicone-base powder additives include Shin-Etsu KMP 597, Shin-Etsu KMP 600, and Shin-Etsu KMP 701.

In some embodiments, the damping materials include one or more high surface area inorganic fillers or combinations of fillers and pigments such as carbon black, calcium carbonate, titanium dioxide, silica (hydrophilic and hydrophobic modified), mica, talc, kaolin, clay, diatomaceous earth, barium sulfate, aluminum sulfate, or mixtures of two or more thereof. Examples of commercially available high surface area inorganic fillers include those available from Evonik Degussa GmbH (Essen, Germany). Inorganic fillers including the foregoing examples can be used to modulate the damping and other physical properties of the damping patch. A wide variety of organic fillers could also or alternatively be used.

In another embodiment, a useful filler combination includes an anti-blocking agent which is chosen depending on the processing and/or use conditions. Examples of such agents include, for example, silica, talc, diatomaceous earth, and any mixtures thereof. The filler particles can be finely divided substantially water-insoluble inorganic filler particles.

The finely divided substantially water-insoluble inorganic filler particles can include particles of metal oxides. The metal oxide constituting the particles can be a simple metal oxide, i.e., the oxide of a single metal, or it can be a complex metal oxide, i.e., the oxide of two or more metals. The particles of metal oxide can be particles of a single metal oxide or they can be a mixture of different particles of different metal oxides. Examples of suitable metal oxides include, but are not limited to, alumina, silica, and titania. Other oxides can optionally be present in minor amount. Examples of such optional oxides include, but are not limited to, zirconia, hafnia, and yttria. Other metal oxides that can optionally be present are those that are ordinarily present as impurities such as for example, iron oxide. For purposes of the present specification and claims, silicon is considered to be a metal. When the particles are particles of alumina, most often the alumina is alumina monohydroxide. Particles of alumina monohydroxide, AlO(OH), and their preparation are known.

Metallic powders can be used in the damping materials, for example, metal powders such as aluminum, copper or special steel, molybdenum disulfide, iron oxide, e.g., black iron oxide, antimony-doped titanium dioxide and nickel doped titanium dioxide. Metal alloy particulates can also be used.

Additives, such as carbon black and other pigments, ultraviolet light absorbers, ultraviolet stabilizers, antioxidants, fire retardant agents, thermally or electrically conductive agents, post curing agents, and the like can be blended into the damping materials to modify the properties of the damping patch. These additives can also include, for example, one or more inhibitors, defoamers, colorants, luminescents, buffer agents, anti-blocking agents, wetting agents, matting agents, antistatic agents, acid scavengers, processing aids, extrusion aids, and others. Ultraviolet light absorbers include hydroxyphenyl benzotriazoles and hydrobenzophenones. Antioxidants include, for example, hindered phenols, amines, and sulfur and phosphorus hydroxide decomposers, such as Irganox 1520L. The fillers, pigments, plasticizers, flame retardants, UV stabilizers, and the like are optional in many embodiments and can be used at concentrations of from about 0 to about 30% or more, such as up to about 40% in particular embodiments. In certain embodiments, the total amount of fillers (inorganic and/or organic), pigments, plasticizers, flame retardants, UV stabilizers, and combinations thereof is from about 0.1% to about 30%, and more particularly from about 1% to about 20%.

The damping materials can also comprise one or more solvents. Nonlimiting examples of suitable solvents include toluene, xylene, tetrahydrofuran, hexane, heptane, cyclohexane, cyclohexanone, methylene chloride, isopropanol, ethanol, ethyl acetate, butyl acetate, isopropyl acetate, and combinations thereof. It will be appreciated that the present subject matter damping materials are not limited to such solvents and can utilize a wide array of other solvents, additives, and/or viscosity adjusting agents, such as reactive diluents.

Constraining Layers

The disclosed multilayer damping laminates may comprise at least one constraining layer. The constraining layer(s) can serve to provide rigidity and stiffness to the laminate structure, and to define and differentiate multiple discontinuous damping layers, when present, of the laminate. In some cases, the damping laminate comprises a first discontinuous damping layer and at least one additional discontinuous damping layer, wherein the first and at least one additional discontinuous damping layer are separated from one another by at least one constraining layer. In some embodiments, at least one constraining layer is an internal constraining layer, and at least a portion of the internal constraining layer is disposed between the first discontinuous damping layer at least one additional discontinuous damping layer. One face of the internal constraining layer can be directly adjacent to the first discontinuous damping layer, or there can be one or more intervening layers disposed between the internal constraining layer and the first discontinuous damping layer. An opposite face of the internal constraining layer can be directly adjacent to at least one additional discontinuous damping layer, or there can be one or more intervening layers disposed between the internal constraining layer and at least one additional discontinuous damping layer. The percent coverage of the internal constraining layer by the damping material regions of the first discontinuous damping layer can be as described above.

In some cases, the multilayer damping laminate comprises an external constraining layer. An external constraining layer is a constraining layer that can provide an outer surface of the laminate, open to the external environment and opposite a substrate to which the laminate can be applied. At least a portion of at least one additional discontinuous damping layer of the laminate can be disposed between the first discontinuous damping layer and the external constraining layer. At least a portion of the second damping layer can be disposed between the internal constraining layer and the external constraining layer. One face of the external constraining layer can be directly adjacent to at least one additional discontinuous damping layer, or there can be one or more intervening layers between at least one additional discontinuous damping layer and the external constraining layer. In some cases, one face of at least one additional discontinuous damping layer is directly adjacent to the internal constraining layer, and an opposite face of at least one additional discontinuous damping layer is directly adjacent to the external constraining layer. The percent coverage of the external constraining layer by the damping material regions of at least one additional discontinuous damping layer can be as described above.

The thickness of each constraining layer of the damping laminate can, for example, independently range from about 5 μm to about 3000 μm, e.g., from about 5 μm to about 2500 μm, from about 5 μm to about 2000 μm, from about 5 μm to about 1500 μm, from about 5 μm to about 1000 μm, from about 5 μm to about 500 μm, from about 5 μm to about 230 μm, from about 9.5 μm to about 440 μm, from about 18 μm to about 830 μm, from about 34 μm to about 1600 μm, or from about 65 μm to about 3000 μm. In terms of upper limits, the thickness of each constraining layer can independently be less than about 3000 μm, e.g., less than about 1600 μm, less than about 830 μm, less than about 440 μm, less than about 230 μm, less than about 120 μm, less than about 65 μm, less than about 34 μm, less than about 18 μm, or less than about 9.5 μm. In terms of lower limits, the thickness of each constraining layer can independently be greater than about 5 μm, greater than about 9.5 μm, greater than about 18 μm, greater than about 34 μm, greater than about 65 μm, greater than about 120 μm, greater than about 230 μm, greater than about 440 μm, greater than about 830 μm, or greater than about 1600 μm. Larger thicknesses, e.g., greater than about 3000 μm, and smaller thicknesses, e.g., less than about 5 μm, are also contemplated.

Each constraining layer can independently comprise one or more stiffening materials that serve to provide a stiffened structure to each constraining layer, wherein each of the constraining layers can have a similar or different composition. The stiffening materials can include one or more polymeric materials. Nonlimiting examples of polymeric materials include polyvinyl chloride (PVC), polyolefins such as polyethylene (PE) and/or polypropylene (PP), polyethylene terephthalate (PET), polycarbonate (PC), polystyrene (PS), and combinations of these and other materials.

In many embodiments, at least one constraining layer comprises a metal. The metal of at least one constraining layer may comprise at least one metal of aluminum, steel, magnesium, bronze, copper, brass, titanium, iron, beryllium, molybdenum, tungsten, or osmium. In some embodiments, the metal is a metal powder. In other embodiments, the metal is a metal foil. In yet other embodiments, at least one constraining layer comprises both a metal powder and a metal foil. The metals may be stiffening materials and can include one or more metals or metal alloys. Nonlimiting examples of metals include aluminum, steel, magnesium, bronze, copper, brass, titanium, iron, beryllium, molybdenum, tungsten, or osmium. In some embodiments, the internal constraining layer and the external constraining layer are each independently a metal foil, e.g., aluminum foil. Metal foils may include, but are not limited to, at least one metal of aluminum, steel, magnesium, bronze, copper, brass, titanium, iron, beryllium, molybdenum, tungsten, or osmium.

The stiffening materials can include one or more natural or manufactured woods. The stiffening materials can include one or more fibers. Nonlimiting examples of fibers include hemp fibers, flax fibers, glass fibers, and carbon fibers. The stiffening materials can include one or more carbon based materials, including carbon nanotubes, graphene, diamond, carbine, or combinations thereof. Composite materials and combinations of these materials could also be used.

Liner Layer

In some cases, the multilayer laminate film further comprises a liner layer connected to the discontinuous damping layer. In one embodiment, the discontinuous damping layer may be first discontinuous damping layer. One face of the liner layer can be directly adjacent to the discontinuous damping layer, or there can be one or more intervening layers between the discontinuous damping layer and the liner layer. In some cases, one face of the discontinuous damping layer is directly adjacent to at least one constraining layer, and an opposite face of the discontinuous damping layer is directly adjacent to the liner layer. In one embodiment, the multilayer laminate film further comprises a liner layer connected to the first discontinuous damping layer opposite at least one constraining layer.

The releasable liner can function as a protective cover such that the release liner remains in place until the multilayer damping laminate is ready for attachment to an object or surface. If a liner or release liner is included in the laminate, a wide array of materials and configurations can be used for the liner. In many embodiments, the liner is a paper or paper-based material. In many other embodiments, the liner is a polymeric film of one or more polymeric materials. Typically, at least one face of the liner is coated with a release material such as a silicone or silicone-based material. As will be appreciated, the release coated face of the liner is placed in contact with the otherwise exposed face of the outer discontinuous damping layer. Prior to application of the label to a surface of interest, the liner is removed to thereby expose the discontinuous damping layer of the laminate. The liner can be in the form of a single sheet. Alternatively, the liner can be in the form of multiple sections or panels.

The following embodiments are contemplated. All combinations of features and embodiment are contemplated.

Embodiment 1: A multilayer damping laminate comprising: at least one constraining layer; and a discontinuous damping layer comprising one or more damping material regions and one or more gap regions, wherein the percent coverage of the discontinuous damping layer by the one or more damping material regions is less than 99%, and wherein the multilayer damping laminate has a composite loss factor at 200 Hz that is greater than 0.05.

Embodiment 2: An embodiment of embodiment 1, wherein the percent coverage of the discontinuous damping layer by the one or more damping material regions is less than 90%.

Embodiment 3: An embodiment of embodiment 1 or 2, wherein the percent coverage of the discontinuous damping layer by the one or more damping material regions is greater than 50%.

Embodiment 4: An embodiment of any of the embodiments of embodiment 1-3, wherein the average width of the one or more gap regions is less than 0.200 cm.

Embodiment 5: An embodiment of any of the embodiments of embodiment 1-4, wherein the average width of the one or more damping material regions is less than 1.000 cm.

Embodiment 6: An embodiment of any of the embodiments of embodiment 1-5, wherein the ratio of the average width of the one or more damping material regions to the average width of the one or more gap regions is greater than 2.

Embodiment 7: An embodiment of any of the embodiments of embodiment 1-6, wherein the ratio of the average width of the one or more gap regions to the thickness of the discontinuous damping layer is less than 17.

Embodiment 8: An embodiment of any of the embodiments of embodiment 1-7, wherein the ratio of the average width of the one or more damping material regions to the thickness of the discontinuous damping layer is less than 83.

Embodiment 9: An embodiment of any of the embodiments of embodiment 1-8, wherein the discontinuous damping layer is directly adjacent to at least one constraining layer.

Embodiment 10: An embodiment of any of the embodiments of embodiment 1-9, wherein the thickness of the discontinuous damping layer ranges from 2 μm to 5000 μm.

Embodiment 11: An embodiment of any of the embodiments of embodiment 1-10, wherein the thickness of at least one constraining layer ranges from 5 μm to 3000 μm.

Embodiment 12: An embodiment of any of the embodiments of embodiment 1-11, wherein each of the one or more damping material regions comprises a pressure sensitive adhesive.

Embodiment 13: An embodiment of any of the embodiments of embodiment 1-12, wherein at least one constraining layer comprises a metal.

Embodiment 14: An embodiment of any of the embodiments of embodiment 1-13, further comprising: a liner layer connected to the first discontinuous damping layer opposite at least one constraining layer.

Embodiment 15: An embodiment of any of the embodiments of embodiment 1-14, wherein the discontinuous damping layer is a first discontinuous damping layer, wherein at least one constraining layer is an internal constraining layer, and wherein the multilayer damping laminate further comprises: at least one additional discontinuous damping layer comprising one or more additional discontinuous layer damping material regions and one or more additional discontinuous damping layer gap regions, wherein at least a portion of the internal constraining layer is disposed between the first discontinuous damping layer and at least one additional discontinuous damping layer; and an external constraining layer, wherein at least a portion of at least one additional discontinuous damping layer is disposed between the internal constraining layer and the external constraining layer, and wherein the percent coverage of at least one additional discontinuous damping layer by the one or more additional discontinuous layer damping material regions is less than 99%.

Embodiment 16: An embodiment of embodiment 15, wherein the percent coverage of the external constraining layer by the one or more additional discontinuous layer damping material regions is less than 90%.

Embodiment 17: An embodiment of embodiment 15 or 16, wherein the percent coverage of the external constraining layer by the one or more additional discontinuous layer damping material regions is greater than 50%.

Embodiment 18: An embodiment of any of the embodiments of embodiment 15-17, wherein the average width of the one or more additional damping layer gap regions is less than 0.200 cm.

Embodiment 19: An embodiment of any of the embodiments of embodiment 15-18, wherein the average width of the one or more additional discontinuous damping layer damping material regions is less than 1.000 cm.

Embodiment 20: An embodiment of any of the embodiments of embodiment 15-19, wherein the ratio of the average width of the one or more additional discontinuous damping layer damping material regions to the average width of the one or more additional discontinuous damping layer gap regions is greater than 2.

Embodiment 21: An embodiment of any of the embodiments of embodiment 15-20, wherein the ratio of the average width of the one or more additional discontinuous damping layer gap regions to the thickness of at least one additional discontinuous damping layer is less than 17.

Embodiment 22: An embodiment of any of the embodiments of embodiment 15-21, wherein the ratio of the average width of the one or more additional discontinuous damping layer damping material regions to the thickness of at least one additional discontinuous damping layer is less than 83.

Embodiment 23: An embodiment of any of the embodiments of embodiment 15-22, wherein at least one additional discontinuous damping layer is directly adjacent to the external constraining layer.

Embodiment 24: An embodiment of any of the embodiments of embodiment 15-23, wherein the thickness of at least one additional discontinuous damping layer ranges from 2 μm to 5000 μm.

Embodiment 25: An embodiment of any of the embodiments of embodiment 15-24, wherein the thickness of the external constraining layer ranges from 5 μm to 3000 μm.

Embodiment 26: An embodiment of any of the embodiments of embodiment 15-25, wherein one or more additional discontinuous damping layer damping material regions comprises a pressure sensitive adhesive.

Embodiment 27: An embodiment of any of the embodiments of embodiment 15-26, wherein the external constraining layer comprises a metal.

Embodiment 28: An embodiment of any of the embodiments of embodiment 1-14, wherein the discontinuous damping layer is a first discontinuous damping layer, wherein at least one constraining layer is a first internal constraining layer, and wherein the multilayer damping laminate further comprises: N additional discontinuous damping layers, wherein N is an integer greater than or equal to 2, wherein each additional discontinuous damping layer comprises one or more additional damping material regions and one or more additional gap regions, and wherein at least a portion of the first internal constraining layer is disposed between the first discontinuous damping layer and the first additional discontinuous damping layer; and M additional internal constraining layers, wherein M is an integer ranging from 1 to N−1, wherein at least a portion of each $M^{th}$ additional internal constraining layer is disposed between the $M^{th}$ additional discontinuous damping layer and the $(M+1)^{th}$ additional discontinuous damping layer, and wherein the percent coverage of the N additional discontinuous damping layers by the one or more additional damping material regions is less than 99%; and an external constraining layer, wherein at least a portion of the $N^{th}$ additional discontinuous damping layer is disposed between the $(N−1)^{th}$ additional internal constraining layer and the external constraining layer, and wherein the percent coverage of the N additional discontinuous damping layers by the one or more additional damping material regions is less than 99%.

Embodiment 29: A system comprising: a base substrate; and the multilayer damping laminate of an embodiment of any of the embodiments of embodiment 1-28, wherein the discontinuous damping layer is connected to the base substrate.

Embodiment 30: A method of reducing a vibration to a base substrate, the method comprising: providing a base substrate that is subject to a vibration; and connecting the discontinuous damping layer of the multilayer damping laminate of an embodiment of any of the embodiments of embodiment 1-28 to the base substrate, thereby reducing the vibration of the base substrate.

The present disclosure will be better understood in view of the following non-limiting examples.

Examples

A sheet of adhesive transfer tape HPA 1905, commercially available from Avery Dennison, was cut into rectangular strips having widths of 0.500 inches (1.270 cm) to serve as damping material. These strips were then applied to sheets of aluminum foil backing having a thickness of 5 mil (125 μm), forming damping material regions of a discontinuous damping layer on the aluminum foil constraining layer. The strips were applied to the foil with two different gap region widths between adjacent strips. In one arrangement, gap regions having a 0.25-inch width were used such that approximately 75% of the surface area of the foil was covered by the adhesive strips. In a second arrangement, gap regions having 0.500-inch widths were used such that approximately 50% of the surface area of the foil was covered by the adhesive strips. One sheet having each adhesive strip arrangement was then laminated to another having an identical adhesive strip arrangement to create multilayer constrained layer damping structures, each having two discontinuous damping layers and two constraining layers. FIG. 1 illustrates side views of the two prepared laminate structures (Comparative Examples A and B), as well as of a conventional control laminate structure control having continuous damping adhesive layers providing total coverage of its constraining aluminum foil layers.

Figure 2A:
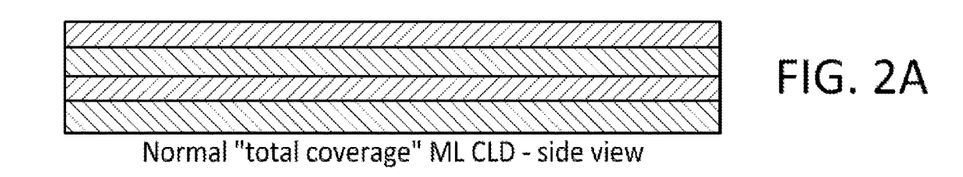
FIG. 2 presents side view illustrations of a conventional multilayer constrained layer damping laminate and two multilayer constrained layer damping laminates having discontinuous damping layers.
Figure 2B:
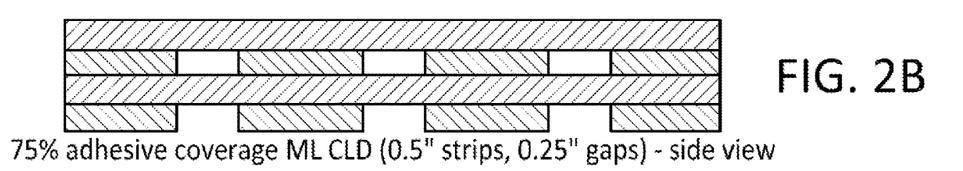
Figure 2C:
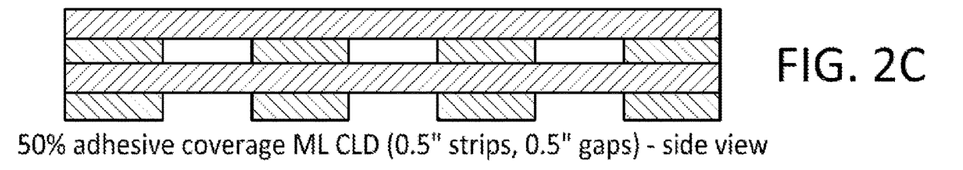

Samples of each of the three above damping laminate structures were cut perpendicular to the adhesive strips, and tested using a Vibration Beam Technique apparatus according to the standard protocol SAE J1637_201306 to determine composite loss factors. FIG. 2 shows the composite loss factor versus temperature for each of Comparative Examples A and B and the control laminate. From the graph it can be seen that the peak composite loss factors of the laminates having discontinuous damping layers (Comparative Examples A and B) were lower than that of the continuous damping layer control. These results demonstrate that some damping properties can be negatively impacted by the use of some discontinuous or patterned adhesive damping layers.

A laser cutter was then used to obtain narrower strips of the 4.9-mil HPA 1905 adhesive transfer tape damping material. The rectangular cut adhesive strips formed damping material regions having widths of 1.000 cm (Comparative Example C), 0.500 cm (Example 1), and 0.250 cm (Example 2). The damping material regions were attached to aluminum foil constraining layers and laminated as described above to create multilayer constrained layer damping structures having the configurations shown in FIGS. 4-6. The Comparative Example D damping layer configuration shown in FIG. 4 arranged damping material regions having 1.000-cm width in parallel separated by gap regions having 0.200-cm widths. The Example 1 damping layer configuration shown in FIG. 5 arranged damping material regions having 0.500-cm widths in parallel separated by gap regions having 0.100-cm widths. The Example 2 damping layer configuration shown in FIG. 6 arranged damping material regions having 0.250-cm widths in parallel separated by gap regions having 0.050-cm widths. In each case, the multilayer constrained layer damping structure had an overall length and width of approximately 30 cm by 10 cm, and the percent coverage of the aluminum foil constraining layers by the damping material regions of the discontinuous damping layers was approximately 83%.

Figure 6:
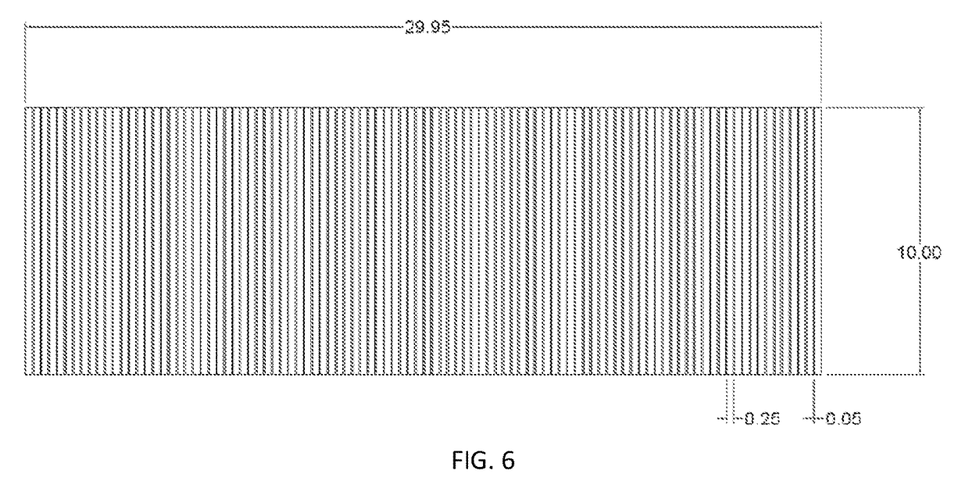
FIG. 6 presents a top view illustration of at least one discontinuous damping layer having 0.250-cm damping region widths and 0.05-cm gap region widths.
Figure 7:
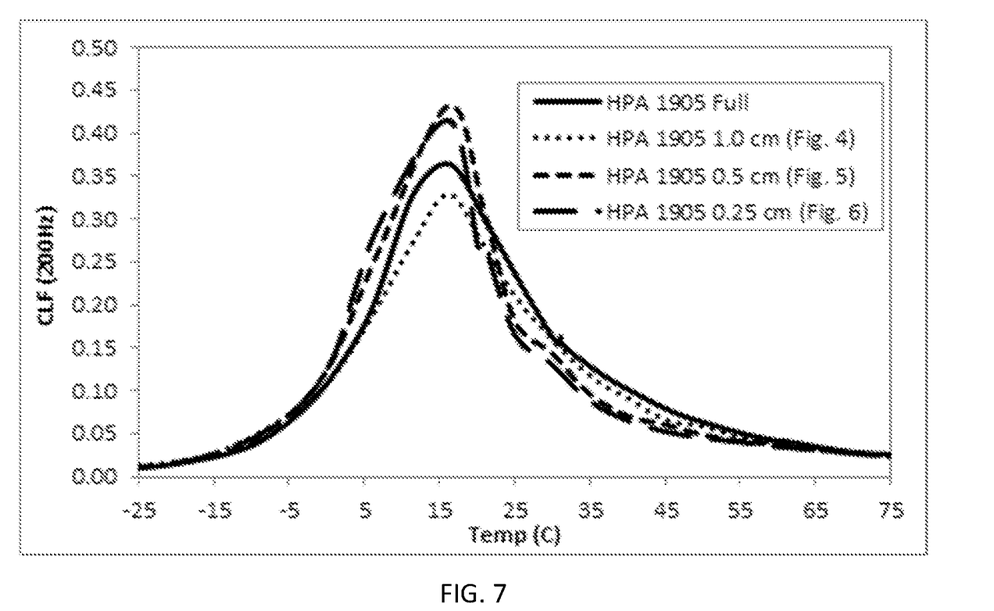
FIG. 7 is a graph of composite loss factors of the laminates of FIGS. 3-5 each having at least one discontinuous damping layer thickness of 5 mil.

The Comparative Example D and Examples 1 and 2 laminates were tested as described above using Vibration Beam Technique equipment and the SAE J1637_201306 protocol, with results of using the HPA 1905 adhesive shown in FIG. 7. From the composite loss factor trends of the graph it can be seen that the Comparative Example D multilayer laminate showed a decrease in peak damping as compared to the continuous damping layer control. In contrast, the Example 1 and Example 2 multilayer laminates (FIG. 5 and FIG. 6) showed a significant increase in peak composite loss factor compared to the control. These results demonstrated that decreasing the widths of the damping material regions and the gap regions of the discontinuous damping layer resulted in an advantageous increase in damping performance.

Figure 3:
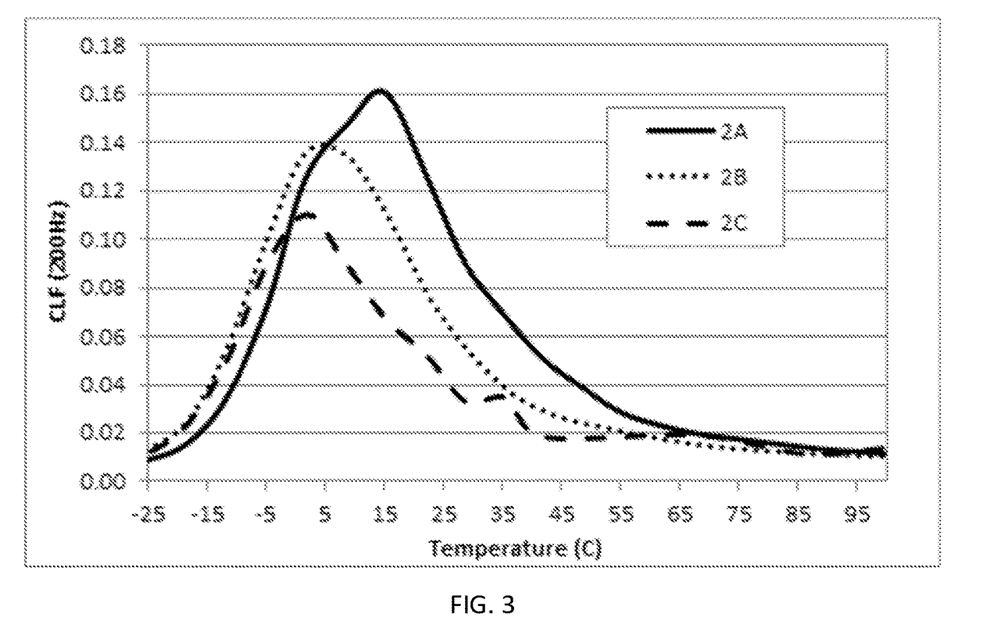
FIG. 3 is a graph of composite loss factors of the laminates of FIG. 1.

The laser cutter was then used to obtain narrower strips of the 2.4-mil HPA 1902 adhesive transfer tape damping material, also available from Avery Dennison. The rectangular cut adhesive strips formed damping material regions having widths of 1.000 cm (Comparative Example E), 0.50 cm (Example 3), and 0.250 cm (Example 4). The damping material regions were attached to aluminum foil constraining layers and laminated as described above to create multilayer constrained layer damping structures also having the configurations shown in FIGS. 3-5, but with smaller 2.4-mil damping layer thicknesses. The Comparative Example D damping layer configuration shown in FIG. 4 arranged damping material regions having 1.000-cm width in parallel separated by gap regions having 0.200-cm widths. The Example 1 damping layer configuration shown in FIG. 5 arranged damping material regions having 0.50-cm widths in parallel separated by gap regions having 0.100-cm widths. The Example 2 damping layer configuration shown in FIG. 6 arranged damping material regions having 0.250-cm widths in parallel separated by gap regions having 0.050-cm widths. In each case, the constrained layer damping structure had an overall length and width of approximately 30 cm by 10 cm, and the percent coverage of the aluminum foil constraining layers by the damping material regions of the discontinuous damping layers was approximately 83%.

FIG. 7 depicts a graph with results of Vibration Beam Technique testing of the Comparative Example D and Examples 1 and 2 laminates (the laminates of FIGS. 4-6) each having at least one discontinuous damping layer thickness of 5 mil. As with the HPA 1905 data, the composite loss factor trends of FIG. 7 show that the use of a larger discontinuous damping layer gap size as in Comparative Example D caused a decrease in peak damping, while the use of smaller discontinuous damping layer gap sizes as in Examples 4 and 5 caused an increase in peak damping. These results further demonstrate the benefits of certain discontinuous damping layers in increasing damping performance and decreasing a required amount of damping material to achieve this performance.

Figure 4:
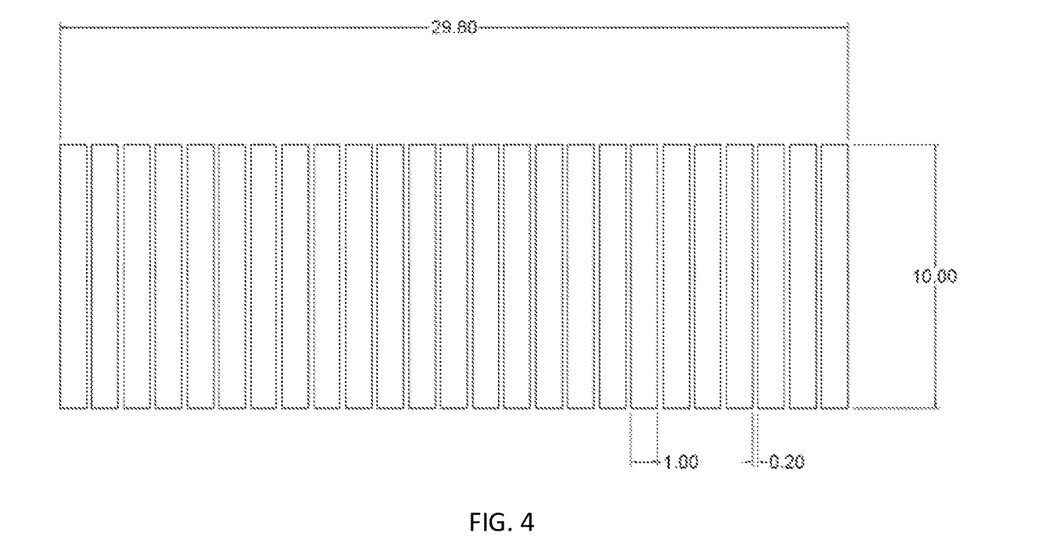
FIG. 4 presents a top view illustration of at least one discontinuous damping layer having 1.000-cm damping region widths and 0.200-cm gap region widths.
Figure 5:
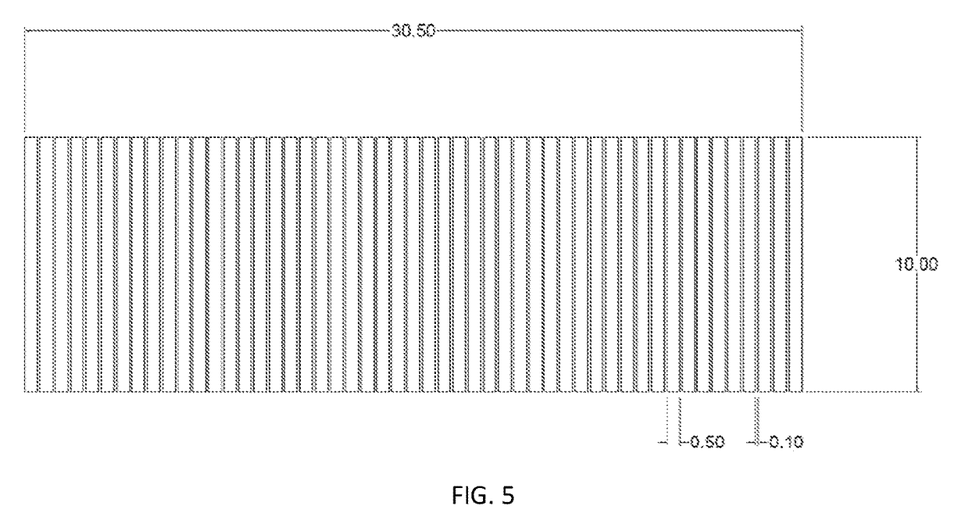
FIG. 5 presents a top view illustration of at least one discontinuous damping layer having 0.50-cm damping region widths and 0.100-cm gap region widths.
Figure 8:
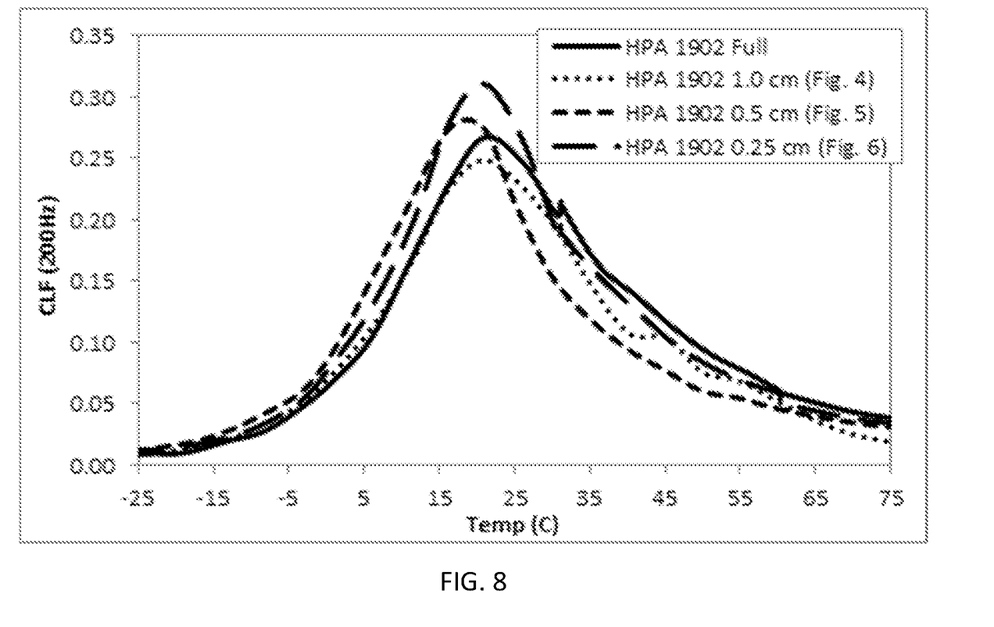
FIG. 8 is a graph of composite loss factors of the laminates of FIGS. 3-5 each having at least one discontinuous damping layer thickness of 2 mil.

FIG. 8 is a graph of composite loss factors of the laminates of FIGS. 4-6 each having at least one discontinuous damping layer thickness of 2 mil. Like the HPA 1905 data of FIG. 7, the composite loss factor trends of FIG. 8 show that the use of a larger discontinuous damping layer gap size as in Comparative Example D caused a decrease in peak damping, while the use of smaller discontinuous damping layer gap sizes as in Examples 1 and 2 caused an increase in peak damping. These results further demonstrate the benefits of certain discontinuous damping layers in increasing damping performance and decreasing a required amount of damping material to achieve this performance.

The above findings are summarized in Table 1 below. The results demonstrate that that some damping properties can be positively impacted by the use of particular discontinuous or patterned adhesive damping layers. In particular, improvements in the peak composite loss factor were observed with the use of discontinuous damping layers characterized by one or more of an average gap region width less than 0.200 cm, an average damping material region width less than 1.000 cm.

TABLE 1

Discontinuous Damping Layer Results

| | Comp. A | Comp. B | Comp. C | Ex. 1 | Ex. 2 | Comp. D | Ex. 3 | Ex. 4 |
|---|---|---|---|---|---|---|---|---|
| Layer thickness (μm) | 120 | 120 | 120 | 120 | 120 | 61 | 61 | 61 |
| Gap width (cm) | 1.27 | 0.634 | 0.200 | 0.100 | 0.050 | 0.200 | 0.100 | 0.050 |
| Damping width (cm) | 1.27 | 1.27 | 1.000 | 0.500 | 0.250 | 1.000 | 0.500 | 0.250 |
| Damping width/Gap width | 1 | 2 | 5 | 5 | 5 | 5 | 5 | 5 |
| Gap width/layer thickness | 110 | 53 | 17 | 8.3 | 4.2 | 33 | 16 | 8.2 |
| Damping width/layer thickness | 110 | 110 | 83 | 42 | 21 | 160 | 82 | 41 |
| Peak CLF change (%) | −25 | −13 | −9 | 21 | 17 | −6 | 6 | 15 |

While what is disclosed herein has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit what is disclosed herein.

We claim:

1. A multilayer damping laminate comprising:
   at least one constraining layer; and
   a discontinuous damping layer comprising one or more damping material regions and one or more gap regions,
   wherein a percent coverage of the discontinuous damping layer by the one or more damping material regions is less than about 99%, and
   wherein the multilayer damping laminate has a composite loss factor at about 200 Hz that is greater than about 0.05; and
   wherein the average width of the one or more gap regions is less than about 0.200 cm.

2. The multilayer damping laminate of claim 1, wherein the percent coverage of the discontinuous damping layer by the one or more damping material regions is less than or equal to about 90%.

3. The multilayer damping laminate of claim 1, wherein the percent coverage of the discontinuous damping layer by the one or more damping material regions is greater than or equal to about 70%.

4. The multilayer damping laminate of claim 1, wherein the percent coverage of the discontinuous damping layer by the one or more damping material regions is greater than about 50%.

5. The multilayer damping laminate of claim 1, wherein an average width of the one or more damping material regions is less than or equal to about 1.000 cm.

6. The multilayer damping laminate of claim 1, wherein the discontinuous damping layer is directly adjacent to at least one constraining layer.

7. The multilayer damping laminate of claim 1, wherein a thickness of the discontinuous damping layer ranges from about 2 µm to about 5000 µm.

8. The multilayer damping laminate of claim 1, wherein a thickness of at least one constraining layer ranges from about 5 µm to about 3000 µm.

9. The multilayer damping laminate of claim 1, wherein each of the one or more damping material regions comprises a pressure sensitive adhesive.

10. The multilayer damping laminate of claim 1, wherein at least one constraining layer comprises a metal.

11. The multilayer damping laminate of claim 10, wherein the metal is a metal foil.

12. The multilayer damping laminate of claim 10, wherein the metal comprises at least one metal of aluminum, steel, magnesium, bronze, copper, brass, titanium, iron, beryllium, molybdenum, tungsten, or osmium.

13. The multilayer damping laminate of claim 1, further comprising:
    a liner layer connected to the discontinuous damping layer opposite at least one constraining layer.

14. The multilayer damping laminate of claim 1, wherein the discontinuous damping layer is a first discontinuous damping layer, wherein at least one constraining layer is an internal constraining layer, and wherein the multilayer damping laminate further comprises:
    at least one additional discontinuous damping layer comprising one or more additional discontinuous layer damping material regions and one or more additional discontinuous damping layer gap regions, wherein at least a portion of the internal constraining layer is disposed between the first discontinuous damping layer and at least one additional discontinuous damping layer; and
    an external constraining layer, wherein at least a portion of at least one additional discontinuous damping layer is disposed between the internal constraining layer and the external constraining layer, and wherein the percent coverage of at least one additional discontinuous damping layer by the one or more additional discontinuous layer damping material regions is less than about 99%.

15. The multilayer damping laminate of claim 14, wherein the percent coverage of at least one additional discontinuous damping layer by the one or more additional discontinuous layer damping material regions is less than or equal to about 90%.

16. The multilayer damping laminate of claim 14, wherein the percent coverage of at least one additional discontinuous damping layer by the one or more additional discontinuous layer damping material regions is greater than about 70%.

17. The multilayer damping laminate of claim 14, wherein the percent coverage of at least one additional discontinuous damping layer by the one or more additional discontinuous layer damping material regions is greater than about 50%.

18. The multilayer damping laminate of claim 14, wherein the average width of the one or more additional damping layer gap regions is less than about 0.200 cm.

19. The multilayer damping laminate of claim 14, wherein the average width of the one or more additional discontinuous damping layer damping material regions is less than about 1.000 cm.

20. The multilayer damping laminate of claim 14, wherein at least one additional discontinuous damping layer is directly adjacent to the external constraining layer.

21. The multilayer damping laminate of claim 14, wherein the thickness of at least one additional discontinuous damping layer ranges from about 2 µm to about 5000 µm.

22. The multilayer damping laminate of claim 14, wherein the thickness of the external constraining layer ranges from about 5 µm to about 3000 µm.

23. The multilayer damping laminate of claim 14, wherein one or more additional discontinuous damping layer damping material regions comprises a pressure sensitive adhesive.

24. The multilayer damping laminate of claim 14, wherein the external constraining layer comprises metal.

25. The multilayer damping laminate of claim 24, wherein the metal is a metal foil.

26. The multilayer damping laminate of claim 25, wherein the metal comprises at least one metal of aluminum, steel, magnesium, bronze, copper, brass, titanium, iron, beryllium, molybdenum, tungsten, or osmium.

27. The multilayer damping laminate of claim 1, wherein the discontinuous damping layer is a first discontinuous damping layer, wherein at least one constraining layer is a first internal constraining layer, and wherein the multilayer damping laminate further comprises:

N additional discontinuous damping layers, wherein N is an integer greater than or equal to 2, wherein each additional discontinuous damping layer comprises one or more additional damping material regions and one or more additional gap regions, and wherein at least a portion of the first internal constraining layer is disposed between the first discontinuous damping layer and the first additional discontinuous damping layer; and M additional internal constraining layers, wherein M is an integer ranging from 1 to N−1, wherein at least a portion of each $M^{th}$ additional internal constraining layer is disposed between the $M^{th}$ additional discontinuous damping layer and the $(M+1)^{th}$ additional discontinuous damping layer, and wherein the percent coverage of the N additional discontinuous damping layers by the one or more additional damping material regions is less than about 99%; and an external constraining layer, wherein at least a portion of the $N^{th}$ additional discontinuous damping layer is disposed between the $(N-1)^{th}$ additional internal constraining layer and the external constraining layer, and wherein the percent coverage of the N additional discontinuous damping layers by the one or more additional damping material regions is less than about 99%.

28. A system comprising:
a base substrate; and
the multilayer damping laminate of claim 1, wherein the discontinuous damping layer is connected to the base substrate.

29. A method of reducing a vibration to a base substrate, the method comprising:
providing a base substrate that is subject to a vibration; and
connecting the discontinuous damping layer of the multilayer damping laminate of claim 1 to the base substrate, thereby reducing the vibration of the base substrate.

* * * * *